United States Patent
Huffer et al.

(10) Patent No.: US 12,227,348 B2
(45) Date of Patent: *Feb. 18, 2025

(54) RESEALABLE FILM

(71) Applicant: SONOCO DEVELOPMENT, INC., Hartsville, SC (US)

(72) Inventors: Scott William Huffer, Hartsville, SC (US); Rod Pettis, Elgin, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,553

(22) Filed: Nov. 9, 2023

(65) Prior Publication Data

US 2024/0076111 A1 Mar. 7, 2024

Related U.S. Application Data

(60) Division of application No. 17/678,624, filed on Feb. 23, 2022, now Pat. No. 11,814,226, which is a
(Continued)

(51) Int. Cl.
*B65D 65/40* (2006.01)
*B32B 7/06* (2019.01)
(Continued)

(52) U.S. Cl.
CPC ............... *B65D 65/40* (2013.01); *B32B 7/06* (2013.01); *B32B 7/12* (2013.01); *B32B 27/08* (2013.01);
(Continued)

(58) Field of Classification Search
CPC ...... B65D 65/40; B65D 77/2096; B32B 7/06; B32B 7/12; B32B 27/08; B32B 27/306; B32B 27/32; B32B 2435/02
See application file for complete search history.

(56) References Cited

U.S. PATENT DOCUMENTS

| 4,806,398 A | 2/1989 | Martin, Jr. |
| 5,089,320 A | 2/1992 | Straus et al. |
| (Continued) | | |

FOREIGN PATENT DOCUMENTS

| CN | 102765236 | 11/2012 |
| IT | MI 20111498 A1 | 2/2013 |
| (Continued) | | |

OTHER PUBLICATIONS

International Search Report and Written Opinion for International application No. PCT/US2020/045601; dated Oct. 20, 2020; 13 pages.
(Continued)

*Primary Examiner* — Michael C Miggins
(74) *Attorney, Agent, or Firm* — Nelson Mullins Riley & Scarborough LLP

(57) ABSTRACT

The present invention relates to a resealable container comprising: a polyethylene terephthalate-based container body comprising a bottom side and at least one upwardly extending sidewall, wherein the sidewall terminates in an open end of the container; a flexible film sealed to the container body, over the open end of the container, wherein the flexible film comprises: a polyethylene-based first film layer; a pressure sensitive adhesive layer adjacent a lower surface of the first film layer; a polyolefin plastomer skin layer adjacent a lower surface of the pressure sensitive adhesive layer, wherein the first layer, pressure sensitive adhesive layer, and skin layer are coextruded; and a heat seal layer printed onto a lower surface of the skin layer and heat sealed to the container body.

21 Claims, 3 Drawing Sheets

Related U.S. Application Data continuation of application No. 16/568,491, filed on Sep. 12, 2019, now Pat. No. 11,292,648.

(51) Int. Cl.
| | |
|---|---|
| *B32B 7/12* | (2006.01) |
| *B32B 27/08* | (2006.01) |
| *B32B 27/30* | (2006.01) |
| *B32B 27/32* | (2006.01) |
| *B65D 77/20* | (2006.01) |

(52) U.S. Cl.
CPC ............ *B32B 27/306* (2013.01); *B32B 27/32* (2013.01); *B65D 77/2096* (2013.01); *B32B 2435/02* (2013.01)

(56) References Cited

U.S. PATENT DOCUMENTS

| | | |
|---|---|---|
| 5,919,547 A | 7/1999 | Kocher et al. |
| 5,985,388 A | 11/1999 | Tomita et al. |
| 6,777,050 B1 | 8/2004 | Engelaere |
| 7,422,782 B2 | 9/2008 | Haedt et al. |
| 8,079,470 B2 | 12/2011 | Trajkovich |
| 8,444,902 B2 | 5/2013 | Middleton et al. |
| 8,541,081 B1 | 9/2013 | Ranganathan et al. |
| 8,932,725 B2 | 1/2015 | Koehn et al. |
| 9,573,348 B2 | 2/2017 | Sakellarides |
| 9,656,447 B2 | 5/2017 | Sakellarides |
| 9,676,169 B2 | 6/2017 | Paulino |
| 9,944,446 B2 | 4/2018 | Huffer et al. |
| 2010/0035001 A1 | 2/2010 | Arisandy et al. |
| 2017/0334175 A1 | 11/2017 | Bolognia et al. |
| 2018/0346222 A1 | 12/2018 | Brumbaugh et al. |
| 2019/0001636 A1 | 1/2019 | Kupsch et al. |

FOREIGN PATENT DOCUMENTS

| | | |
|---|---|---|
| JP | 2019151351 A | 9/2019 |
| WO | 0109001 A1 | 2/2001 |
| WO | 2010114879 A1 | 10/2010 |
| WO | 2016196000 A1 | 12/2016 |

OTHER PUBLICATIONS

English machine translation of JP 2019-151351 (Year: 2019); 36 pages; Publication Date Sep. 12, 2019.

RESEALABLE FILM

CROSS-REFERENCE TO RELATED APPLICATION

This application is a divisional of U.S. application Ser. No. 17/678,624, filed on Feb. 23, 2022, which as a continuation of U.S. application Ser. No. 16/568,491, filed on Sep. 12, 2019, now U.S. Pat. No. 11,292,648, entitled "RESEALABLE FILM", which is incorporated herein in its entirety.

FIELD OF THE INVENTION

The present invention relates generally to a resealable polyethylene-based film for use with containers comprising polyethylene terephthalate.

SUMMARY OF THE INVENTION

In an embodiment, the invention is directed to a polyethylene-(PE) based, resealable, coextruded (COEX) film which is adhered to a rim, edge, or flange of a rigid container which comprises polyethylene terephthalate (PET), including amorphous polyethylene terephthalate (APET).

In an embodiment, the invention is directed to a resealable container comprising: a polyethylene terephthalate-based container body comprising a bottom side and at least one upwardly extending sidewall, wherein the sidewall terminates in an open end of the container; a flexible film sealed to the container body, over the open end of the container, wherein the flexible film comprises: a polyethylene-based first film layer; a pressure sensitive adhesive layer adjacent a lower surface of the first film layer; a polyolefin plastomer skin layer adjacent a lower surface of the pressure sensitive adhesive layer, wherein the first layer, pressure sensitive adhesive layer, and skin layer are coextruded; and a heat seal layer printed onto a lower surface of the skin layer and heat sealed to the container body.

In another embodiment, the invention is directed to a resealable container comprising: an amorphous polyethylene terephthalate container body comprising a bottom side and at least one upwardly extending sidewall, wherein the sidewall terminates in an open end of the container; a flexible film sealed to the container body, over the open end of the container, wherein the flexible film comprises: a high density polyethylene first film layer; a pressure sensitive adhesive layer adjacent a lower surface of the first film layer; an ethylene-vinyl acetate skin layer adjacent a lower surface of the pressure sensitive adhesive layer; and a heat seal layer adjacent a lower surface of the skin layer and heat sealed to the container body.

A method of making a resealable container comprising: providing a polyethylene terephthalate-based container body comprising a bottom side and at least one upwardly extending sidewall, wherein the sidewall terminates in an open end of the container; coextruding a flexible film comprising: a polyethylene-based first film layer; a pressure sensitive adhesive layer adjacent a lower surface of the first film layer; a polyolefin plastomer skin layer adjacent a lower surface of the pressure sensitive adhesive layer; printing a heat seal layer adjacent a lower surface of the skin layer to form a heat-sealable film; and heat sealing the heat-sealable film to the container body, over the open end of the container.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
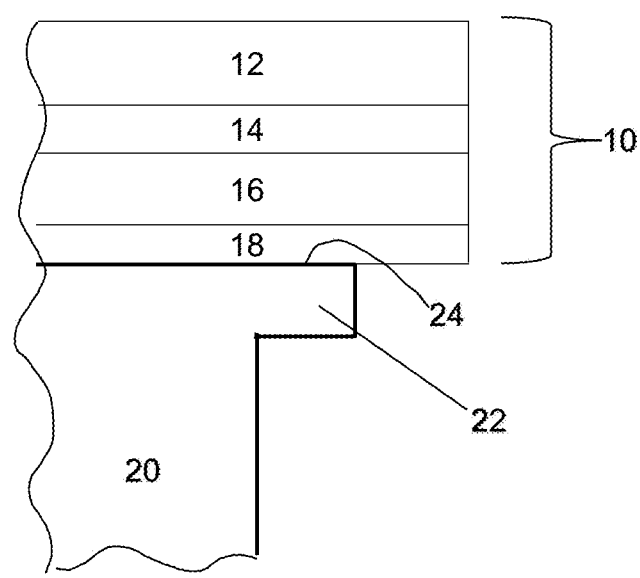
FIG. 1 illustrates an exploded cross-sectional embodiment of the film and container of the invention shown in a closed configuration.

Elements illustrated in the figures are not necessarily drawn to scale. Repeat use of reference characters in the present specification and drawings is intended to represent the same or analogous features or elements of the invention.

DETAILED DESCRIPTION OF PREFERRED EMBODIMENTS

Reference will now be made in detail to embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In an embodiment, the invention comprises a heat-sealable, peelable and resealable multilayer lidding film. The lidding film may be useful for sealing containers which contain food products such as fresh fruit and produce, pharmaceuticals, personal care products, chemical products, cleaning products, or any other products known in the art. In an embodiment, the products may be consumed or used over time and may require multiple container opening and resealing processes. In a particular embodiment, the film may be useful for sealing containers that comprise a molded or shaped container defining a cavity. The container of the invention may have a bottom and one or more sides. The container body may contain one or more vents which allow ventilation or off-gassing. The container bottom and at least one sidewall may define the cavity. The one or more sides may terminate in an edge, rim, or flange. The container may be PET-based, in an embodiment.

In conventional resealable coextruded films (i.e. a coextruded film comprising a resealable adhesive), the film layer(s) are made from a polyethylene-based material. Unfortunately, however, polyethylene-based coextruded films will only seal to PE-based or polypropylene-(PP) based containers and will not seal to PET-based containers. In fact, the inventor is not aware of any resealable coextruded films that are sealable to amorphous PET containers, for example. Further, a heat seal coating that may otherwise allow adhesion to a PET-based container cannot be printed onto a standard coextruded PE films because those PE films are not print-receptive, particularly to a PET-compatible heat seal. Thus, heretofore, there has been no solution which would allow heat-sealing a coextruded PE-based film onto a PET-based container. Through hard work and ingenuity, the inventors have developed a coextruded PE-based film structure which comprises a skin layer that is receptive to a PET-based heat seal coating. The coextruded PE film structure will split at the designated failure location, exposing a pressure sensitive adhesive (PSA) extrudate for reseal purposes.

Figure 2:
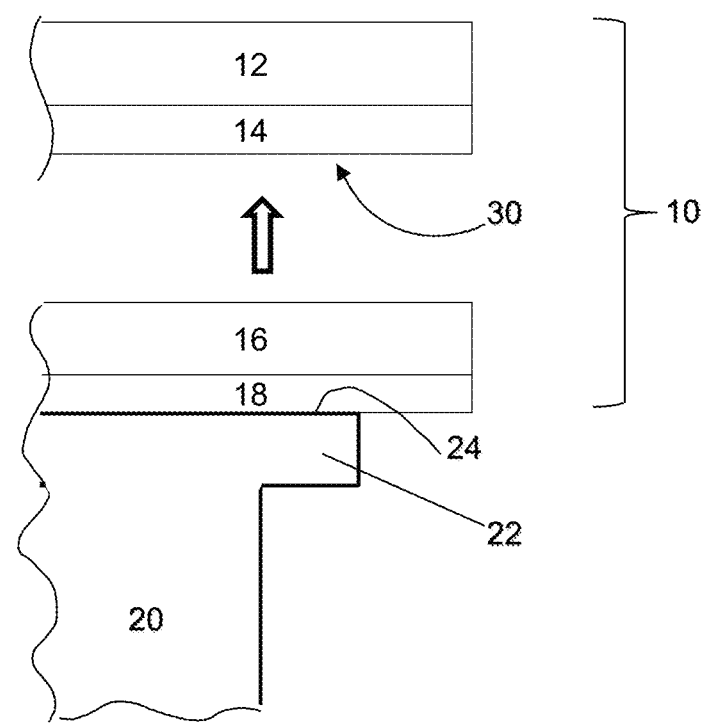
FIG. 2 illustrates an exploded cross-sectional embodiment of the film and container of the invention shown in an open configuration.
Figure 3:
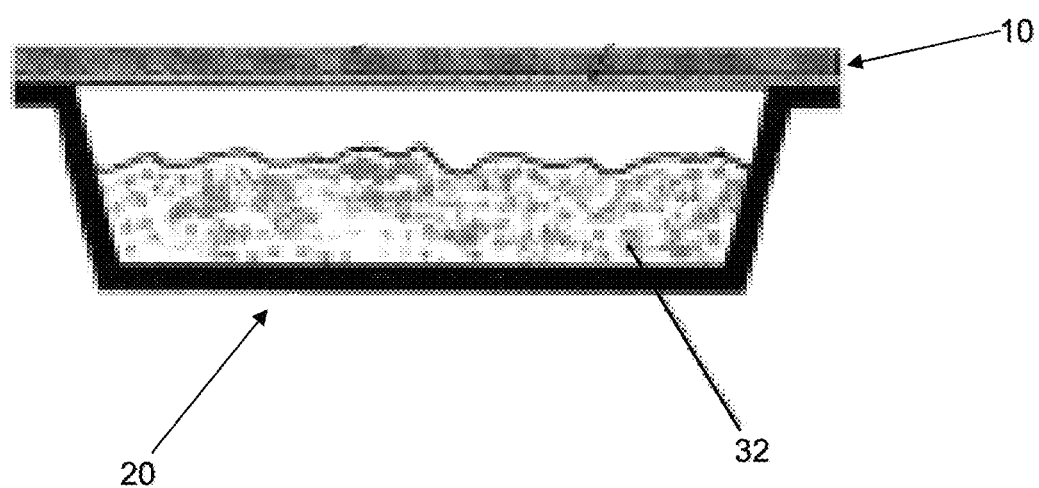
FIG. 3 illustrates a cross-sectional embodiment of the film and container of the invention shown in a closed configuration.

Turning to the drawings, FIGS. 1 and 2 illustrate exploded cross-sectional views of the film 10 of the invention. The film 10 may be applied to a container 20. In an embodiment, the film 10 may be applied to an edge, rim, or flange 22 of a container 20. In an embodiment, the film 10 may be applied to the top surface 24 of the flange 22.

In an embodiment, the film 10 comprises a multilayer structure. In a particular embodiment, the first or outermost layer 12 of the film structure 10 may comprise a PE-based material. As used herein, the term "PE-based" may include high density polyethylene (HDPE), low density polyethylene (LDPE), medium density polyethylene (MDPE), ultra high molecular weight polyethylene (UHMWPE), cross-linked polyethylene (PEX), linear low density polyethylene (LLDPE), very low density polyethylene (VLDPE), polyethylene copolymers, chemically-modified polyethylene, and/or any other PE-based film material. Any polyethylene material known in the art may be utilized in the invention. In an embodiment, a PE-based material comprises any material with the chemical formula $(C_2H_4)_n$. In an embodiment, the first layer 12 may comprise a plurality of layers.

In an embodiment, directly adjacent the first layer 12 is a PSA layer 14. The PSA layer 14 may be coextruded with the first layer 12, in an embodiment. In other embodiments, the PSA layer 14 may be separately applied to the underside of the first layer 12, such as at an adhesive station. In one embodiment, the PSA layer 14 may be pattern applied to the first layer 12. In another embodiment, the PSA layer 14 may be continuous across and/or coextensive with the first layer 12. Any PSA known in the art may be utilized as the PSA layer 14.

In an embodiment, a skin layer 16 may be disposed on the opposite side of the PSA layer 14 from that of the first layer 12. In an embodiment, the skin layer 16 is disposed on the underside of the first layer 12, with respect to the container interior, adhered to the first layer 12 via the PSA layer 14. In an embodiment, the skin layer 16 is coextruded with the first layer 12 and the PSA layer 14. The coextruded, multilayer film of the present invention, in some embodiments, can advantageously be coextruded in a single step. In some embodiments, the coextruded, multilayer film is a blown film; in other embodiments, the coextruded, multilayer film is a cast film. In another embodiment, the skin layer 16 is extrusion coated onto the combined first layer 12 and PSA layer 14. In an embodiment, the skin layer 16 is coextensive with the dimensions of the first layer 12.

The skin layer 16, in an embodiment, has a low seal initiation temperature. In an embodiment, the skin layer 16 comprises a polyolefin plastomer. In an embodiment, the skin layer 16 comprises ethylene-vinyl acetate (EVA). In an embodiment, the skin layer 16 comprises a low seal initiation copolymer that is print receptive. In an embodiment, the skin layer 16 may comprise a long-chain branched, metallocene-catalyzed homogeneous ethylene/alpha-olefin copolymer.

As used herein, the term "polyolefin" refers to olefin polymers and copolymers, especially ethylene and propylene polymers and copolymers, and to polymeric materials having at least one olefinic comonomer, such as ethylene vinyl acetate copolymer and ionomer. Polyolefins can be linear, branched, cyclic, aliphatic, aromatic, substituted, or unsubstituted. Included in the term polyolefin are homopolymers of olefin, copolymers of olefin, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, e.g., maleic acid, fumaric acid or the like, or a derivative thereof such as the anhydride, ester metal salt or the like. It could also be obtained by incorporating into the olefin homopolymer or copolymer, an unsaturated carboxylic acid, e.g., maleic acid, fumaric acid or the like, or a derivative thereof such as the anhydride, ester metal salt or the like.

In an embodiment, the skin layer 16 may comprise up to about 15% of the total thickness of the film 10 structure. In an embodiment, the total thickness of the film structure is between about 1.5 and 2.5 mils. In some embodiments, the skin layer 16 may contain various polymers designed to weaken the affinity of the skin layer 16 for the PSA layer. In an embodiment, the skin layer 16 may be corona treated.

In an embodiment, a heat seal layer 18 is disposed adjacent the skin layer 16, opposite the PSA layer 14. The heat seal layer 18 may be printed onto the underside of the skin layer 16, in an embodiment. Any heat seal material known in the art may be utilized in this embodiment. In an embodiment, the heat seal material may comprise a thermally activatable adhesive composition, such as a hot melt adhesive resin. In an embodiment, the heat seal layer 18 provides the film with the ability to be heat-sealed to trays, containers, or other substrates. In an embodiment, the heat seal layer 18 may comprise a heat seal material which is compatible with sealing to a PET-based container, such as an APET container. In an embodiment, the heat seal layer 18 may comprise a polymeric material. In some embodiments, the heat seal layer 18 and the container 20 may comprise the same polymeric composition. Thus, in some aspects, both the heat seal layer 18 and the container 20 may comprise APET. In some embodiments, the heat seal layer 18 comprises PET and the container 20 may comprise APET.

As used herein, the term "heat seal" refers to the union of two materials by bringing the materials into contact, or at least close proximity, with one another and then applying sufficient heat and, optionally, pressure to a predetermined area (or areas) of the materials to cause the contacting surfaces of the materials in the predetermined area to become molten and intermix with one another, thereby forming an essentially inseparable bond between the two materials in the predetermined area when the heat and, optionally, pressure are removed therefrom and the area is allowed to cool. In accordance with an embodiment of the present invention, a heat seal preferably creates a hermetic seal, i.e., a barrier to the outside atmosphere.

In an embodiment, the container 20 is a PET-based container, such as PET, APET, crystallized polyethylene terephthalate (CPET), reinforced polyethylene terephthalate (RPET), glycol-modified polyethylene terephthalate (PETG), isophthalic acid (iPET), oriented PET, or any other PET copolymer or other PET-based material known in the art. In a particular embodiment, the container 20 comprises APET.

In an embodiment, the film 10 may be heat sealed to the edge or rim of the container 20. In one embodiment, the film 10 may be heat sealed to the flange 22 on at least one side, e.g., on all four sides of the container 20. The container 20 may have a recessed portion and a flange 22. The recessed portion may define a product-receiving cavity. The flange 22 may comprise two opposing edges with the width of the container 20 separating the two. In an embodiment, the film 10 extends across the cavity and is sealed and attached on at least one side, e.g., on all four sides, of the flange 22. After an initial opening of the film 10 such as by a consumer, the lidding may be resealed against the flange 22 and retained closed by the PSA layer 14.

More specifically, in an embodiment shown in FIG. 2, when the film 10 is peeled away from the container 20, a break occurs between the PSA layer 14 and the skin layer 16. That is, the adhesion and/or affinity between the skin layer 16 and the heat seal layer 18 is greater than that between the skin layer 16 and the PSA layer 14. The peel strength to break the bond between the heat seal layer 18 and the skin layer 16 may be greater than the peel strength to break the bond between the skin layer 16 and the PSA layer 14. The PSA layer 14 is retained on the first layer 12 and lifts away from the container 20.

In an embodiment, the skin layer 16 will bond to the surface of the flange 22 with the heat seal layer 18. In this embodiment, the film 10 may fracture at the interface of the skin layer 16 and the PSA layer 14 when the lidding is opened, exposing the extruded pressure sensitive layer 14 for reseal. In another embodiment, the film 10 may fracture at the interface of the first layer 12 and the PSA layer 14 when the lidding is opened, exposing the extruded pressure sensitive layer 14 for reseal. In still another embodiment, the film 10 may fracture internal to the PSA layer 14 when the lidding is opened, exposing some of the extruded pressure sensitive layer 14 for reseal on one or both of the first layer 12 and the skin layer 16.

In an embodiment, a reseal surface 30 may be created on the underside of the first layer 12 or the upper side of the skin layer 16, due to the PSA layer 14. The reseal surface 30 comprises exposed PSA and can be repeatedly re-adhered to the flange 22. In an embodiment, the re-adherence of the first layer 12 to the flange 22 comprises resealing the first layer 12 to the skin layer 16, via the PSA layer 14.

In one embodiment, a corner of the film 10 overhangs at least a portion of the flange 22, e.g., at one or more corners. The overhang(s) may facilitate removal of the film 10 from container 20.

In an embodiment, the layers of the film 10 of the invention comprise, in this order: HDPE layer 12, PSA layer 14, skin layer 16, heat seal layer 18. In an embodiment, the film 10 is heat sealed to an APET container 20. FIG. 4 illustrates a cross-sectional view of a container 20 of the invention, wherein the container 20 contains a food product 32 and is closed via a film 10 of the invention.

In an embodiment, the film 10 may comprise microperforations or macroperforations, and may be mechanically or laser-scored. In an embodiment, the container 20 may be utilized for storage of fresh fruit and produce. In an embodiment, the container 20 may contain perforations or vents.

The accompanying figures are provided for explanatory purposes and may not show the different layers, plies, adhesives, labels, inks, barriers, and other components described above with respect to embodiments of the container. In addition, those components that are illustrated are not necessarily drawn to scale. Thus, certain layers that are shown as the same thickness or thinner than other layers may actually be thicker than other layers, and so on.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of forming a flexible film, the method comprising:
    coextruding a flexible film comprising:
        a polyethylene-based first film layer;
        a pressure sensitive adhesive layer adjacent a lower surface of the first film layer;
        a polyolefin plastomer skin layer adjacent a lower surface of the pressure sensitive adhesive layer; and
    printing a heat seal layer adjacent a lower surface of the skin layer to form a heat-sealable film.

2. The method of claim 1, further comprising:
    providing a polyethylene terephthalate-based container body comprising a base and at least one upwardly extending sidewall, wherein the sidewall terminates in an open end of the container; and
    heat sealing the heat seal layer of the flexible film to the container body, over the open end of the container.

3. The method of claim 1, wherein the polyethylene based first film layer comprises high density polyethylene.

4. The method of claim 1, wherein the polyolefin plastomer skin layer comprises ethylene vinyl acetate.

5. The method of claim 1, wherein the polyolefin based skin layer is print-receptive.

6. The method of claim 1, wherein the polyolefin based skin layer has a low seal initiation temperature.

7. The method of claim 1, wherein the heat seal layer comprises a thermally activatable adhesive.

8. The method of claim 1, wherein the heat seal layer comprises a hot melt adhesive resin.

9. The method of claim 1, wherein the heat seal layer is compatible with polyethylene terephthalate.

10. The method of claim 1, wherein the heat seal layer comprises amorphous polyethylene terephthalate.

11. The method of claim 1, wherein the heat seal layer comprises amorphous polyethylene terephthalate.

12. The method of claim 1, further comprising applying a surface treatment to the polyolefin plastomer skin layer.

13. The method of claim 12, wherein the surface treatment is a corona treatment.

14. A method of forming a flexible film, the method comprising:
    pattern applying a pressure sensitive adhesive layer on a lower surface of a first film layer, wherein the first film layer is a polyethylene based film;
    coextruding a polyolefin plastomer skin layer adjacent a lower surface of the pressure sensitive adhesive layer; and
    printing a heat seal layer adjacent a lower surface of the skin layer to form a heat-sealable film.

15. The method of claim 14, further comprising:
    providing a polyethylene terephthalate-based container body comprising a base and at least one upwardly extending sidewall, wherein the sidewall terminates in an open end of the container; and
    heat sealing the heat seal layer of the flexible film to the container body, over the open end of the container.

16. The method of claim 14, wherein the polyethylene based first film layer comprises high density polyethylene.

17. The method of claim 14, wherein the polyolefin plastomer skin layer comprises ethylene vinyl acetate.

18. The method of claim 14, wherein the polyolefin based skin layer is print-receptive.

19. The method of claim 14, wherein the polyolefin based skin layer has a low seal initiation temperature.

20. The method of claim 14, further comprising applying a corona treatment to the polyolefin plastomer skin layer.

21. The method of claim 14, wherein the heat seal layer comprises a hot melt adhesive resin.

* * * * *